(12) United States Patent
Reddy et al.

(10) Patent No.: US 8,987,971 B2
(45) Date of Patent: Mar. 24, 2015

(54) ROTOR CORE FOR AN ELECTRIC MACHINE (75) Inventors: Patel Bhageerath Reddy, Niskayuna, NY (US); Manoj Shah, Niskayuna, NY (US)

(73) Assignee: General Electric Company, Schnectady, NY (US)

( * ) Notice: Subject to any disclaimer, the term of this patent is extended or adjusted under 35 U.S.C. 154(b) by 492 days.

(21) Appl. No.: 13/310,312

(22) Filed: Dec. 2, 2011

(65) Prior Publication Data

US 2013/0140932 A1 Jun. 6, 2013

(51) Int. Cl.
*H02K 1/26* (2006.01)
*H02K 1/27* (2006.01)
*H02K 1/28* (2006.01)

(52) U.S. Cl.
CPC ............... *H02K 1/2766* (2013.01); *H02K 1/26* (2013.01)
USPC .......... 310/216.086; 310/156.59; 310/156.65; 310/182

(58) Field of Classification Search
CPC ........... H02K 1/22; H02K 1/223; H02K 1/26; H02K 1/265; H02K 1/27; H02K 1/272; H02K 1/274; H02K 1/2746; H02K 1/2753; H02K 1/276; H02K 1/2766; H02K 1/28; H02K 21/16
USPC ............. 310/156.53, 156.55–156.59, 156.09, 310/156.13, 156.14, 216.086, 216.092, 310/216.094, 216.116, 216.121, 216.123, 310/182, 183, 186, 216.109
See application file for complete search history.

(56) References Cited

U.S. PATENT DOCUMENTS

| | | | |
|---|---|---|---|
| 4,336,649 A * | 6/1982 | Glaser | 29/598 |
| 4,700,096 A * | 10/1987 | Epars | 310/153 |
| 4,900,963 A * | 2/1990 | Amano et al. | 310/187 |
| 5,030,871 A | 7/1991 | Shah et al. | |
| 5,091,668 A * | 2/1992 | Cuenot et al. | 310/156.61 |
| 5,378,953 A * | 1/1995 | Uchida et al. | 310/156.59 |
| 5,452,590 A * | 9/1995 | Vigili | 66/8 |
| 7,342,341 B2 | 3/2008 | Lacaze | |
| 7,791,237 B2 | 9/2010 | Shah et al. | |
| 8,018,110 B2 | 9/2011 | Alexander et al. | |
| 2007/0085437 A1 * | 4/2007 | Heideman et al. | 310/156.59 |

(Continued)

FOREIGN PATENT DOCUMENTS

| | | | | |
|---|---|---|---|---|
| JP | 07039091 A * | 2/1995 | | H02K 1/27 |
| JP | 11196556 A * | 7/1999 | | H02K 21/16 |

(Continued)

*Primary Examiner* — Quyen Leung
*Assistant Examiner* — Eric Johnson
(74) *Attorney, Agent, or Firm* — The Small Patent Law Group LLC; Christopher R. Carroll (57) ABSTRACT

A rotor core is provided for an electric machine. The rotor core includes a body extending a length along, and being configured to rotate about, a central longitudinal axis. The body includes spokes arranged radially about the central longitudinal axis and conductor openings arranged radially about the central longitudinal axis. The radial arrangement of the spokes and conductor openings about the central longitudinal axis includes an alternating pattern of spokes and conductor openings. The spokes include slots extending therethrough along the central longitudinal axis. The slots are positioned radially about the central longitudinal axis between adjacent conductor openings. The rotor core also includes conductors extending within the conductor openings of the body.

10 Claims, 7 Drawing Sheets

(56) References Cited

U.S. PATENT DOCUMENTS

| | | | |
|---|---|---|---|
| 2008/0238237 A1* | 10/2008 | Nishihama et al. | 310/166 |
| 2009/0115281 A1* | 5/2009 | Kimura et al. | 310/217 |
| 2010/0156226 A1* | 6/2010 | Islam et al. | 310/154.21 |
| 2010/0277017 A1* | 11/2010 | Alexander et al. | 310/61 |
| 2010/0277028 A1* | 11/2010 | Alexander et al. | 310/156.51 |

FOREIGN PATENT DOCUMENTS

| | | | | |
|---|---|---|---|---|
| JP | 411196556 A | | 7/1999 | |
| JP | 2001218400 A | * | 8/2001 | ............... H02K 1/27 |
| JP | 2006067708 A | * | 3/2006 | |
| JP | 2011217602 A | * | 10/2011 | |

* cited by examiner

FIG. 10

ROTOR CORE FOR AN ELECTRIC MACHINE

BACKGROUND

Rotating electric machines are used for a wide variety of applications, such as automotive applications, aerospace applications, industrial applications, and/or the like. Rotating electric machines include a rotor assembly and a stator. A rotating electric machine may be an electrical motor, wherein the rotor assembly rotates relative to the stator to convert electrical energy to mechanical energy. Rotating electric machines also include electrical generators, wherein the relative rotation between the rotor assembly and the stator converts mechanical energy to electrical energy.

Known rotating electric machines are not without disadvantages. For example, operation of at least some known rotating electric machines may generate harmonics in the rotor assembly and/or the stator that affect performance of the electric machine. Such harmonics may generate asynchronous rotating fields that produce eddy currents in the rotor assembly, the stator, and/or in an air gap between the rotor assembly and the stator. The eddy currents consume power and reduce the efficiency of the rotating electric machine. For example, the eddy currents may generate relatively significant losses in the rotor assembly and/or the stator that reduce efficiency.

BRIEF DESCRIPTION

In one embodiment, a rotor core is provided for an electric machine. The rotor core includes a body extending a length along, and being configured to rotate about, a central longitudinal axis. The body includes spokes arranged radially about the central longitudinal axis and conductor openings arranged radially about the central longitudinal axis. The radial arrangement of the spokes and conductor openings about the central longitudinal axis includes an alternating pattern of spokes and conductor openings. The spokes include slots extending therethrough along the central longitudinal axis. The slots are positioned radially about the central longitudinal axis between adjacent conductor openings. The rotor core also includes conductors extending within the conductor openings of the body.

In another embodiment, a rotor assembly is provided for an electric machine. The rotor assembly includes a shaft extending a length along, and being configured to rotate about, a central longitudinal axis. A rotor core is mounted to the shaft such that the rotor core is configured to rotate with the shaft about the central longitudinal axis. The rotor core includes conductor openings arranged radially about the central longitudinal axis, and spokes arranged radially about the central longitudinal axis. The radial arrangement of the spokes and conductor openings about the central longitudinal axis includes an alternating pattern of spokes and conductor openings. The spokes include slots extending therethrough along the central longitudinal axis. The slots are positioned radially about the central longitudinal axis between adjacent conductor openings. The rotor core also includes conductors extending within the conductor openings.

In yet another embodiment, an electric machine includes a stator extending a length along a central longitudinal axis. The stator includes a stator core having a central opening that extends along the central longitudinal axis. The electric machine also includes a rotor assembly extending within the central opening of the stator core. The rotor assembly includes a rotor core configured to rotate about central longitudinal axis within the central opening. The rotor core includes conductor openings arranged radially about the central longitudinal axis, and spokes arranged radially about the central longitudinal axis. The radial arrangement of the spokes and conductor openings about the central longitudinal axis includes an alternating pattern of spokes and conductor openings. The spokes include slots extending therethrough along the central longitudinal axis. The slots are positioned radially about the central longitudinal axis between adjacent conductor openings. The rotor core also includes conductors extending within the conductor openings.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. As used herein, the term "conductor" is intended to mean a structure that conducts magnetic fields.

Various embodiments provide rotor cores, rotor assemblies, and electric machines. For example, various embodiments of rotor cores, rotor assemblies, and electric machines include rotor cores having spokes and conductor openings arranged radially about a central longitudinal axis, wherein the spokes include slots that are positioned radially about the central longitudinal axis between adjacent conductor openings. At least one technical effect of the various embodiments is a reduction of harmonic content in a rotor core, a rotor assembly and/or a stator. At least one other technical effect of the various embodiments is a reduction of losses of a rotor assembly and/or a stator. At least one other technical effect of the various embodiments is an electric machine having an improved efficiency and/or an increased power density.

The various embodiments may be implemented within electric machines, which include electric motors and electric generators. Applications of electric machines include, but are not limited to, automotive applications, aerospace applications, industrial applications, and/or the like. Embodiments of slots are described and illustrated herein with respect to internal permanent magnet (IPM) machines. However, the various embodiments of slots described and/or illustrated herein are not limited to IPM machines, but rather the various embodiments of slots described and/or illustrated herein may be used with any other type of rotating electric machine having any other design, structure, configuration, arrangement, and/or the like.

Figure 1:
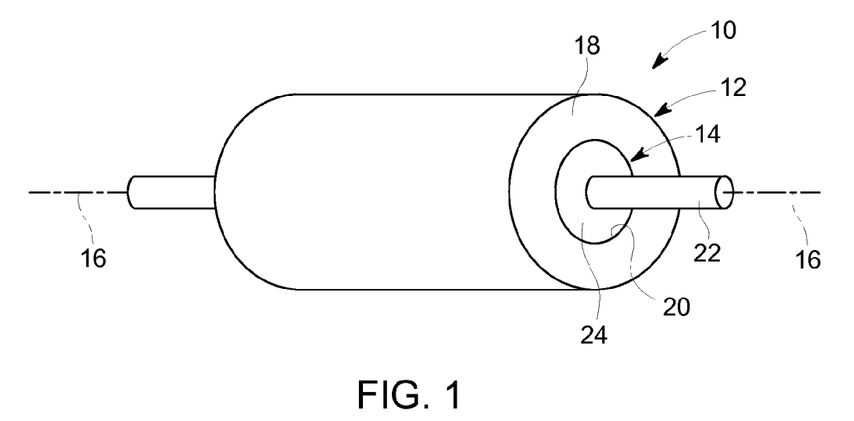
FIG. 1 is a perspective view of an embodiment of an electric machine.

FIG. 1 is a perspective view of an embodiment of an electric machine 10. The electric machine 10 includes a stator 12 and a rotor assembly 14, which are concentrically aligned about a central longitudinal axis 16 of the electric machine 10. The rotor assembly 14 is configured to rotate relative to the stator 12. The electric machine 10 may be an electrical motor, wherein the rotor assembly 14 rotates relative to the stator 12 to convert electrical energy to mechanical energy. Alternatively, the electric machine is an electrical generator, wherein the relative rotation between the rotor assembly 14 and the stator 12 converts mechanical energy to electrical energy. In the illustrated embodiment of the electric machine 10, the electric machine 10 is an IPM machine. But, the electric machine 10 is not limited to being an IPM machine. Rather, the electric machine 10 may be any type of rotating electric machine, such as, but not limited to, a synchronous machine, a multi-phase electric machine, an electric machine with concentrated windings, an electric machine with distributed windings, a reluctance machine, an induction machine, a wound field machine, a salient pole electric machine, an electric machine with permanent magnets arranged differently than an IPM machine (e.g., surface PM machines and/or the like), and/or the like.

The stator 12 extends a length along the central longitudinal axis 16. The stator 12 includes a stator core 18 having a central opening 20 that extends along the central longitudinal axis 16. The rotor assembly 14 extends a length along the central longitudinal axis 16. The rotor assembly 14 includes a shaft 22 and a rotor core 24 mounted to the shaft 22. The shaft 22 is configured to rotate about the central longitudinal axis 16 relative to the stator core 18. The rotor core 24 is mounted to the shaft 22 such that the rotor core 24 is configured to rotate about the central longitudinal axis 16 with the shaft 22.

In the illustrated embodiment of FIG. 1, the rotor assembly 14 extends within the central opening 20 of the stator core 18 and is configured to rotate relative to the stator core 18 within the central opening 20. In other words, the stator core 18 of the electric machine 10 extends around the rotor assembly 14 such that the rotor assembly 14 rotates inside the stator 12. Alternatively, the rotor assembly 14 extends around the stator 12 such that the rotor assembly is configured to rotate around the stator 12.

Figure 2:
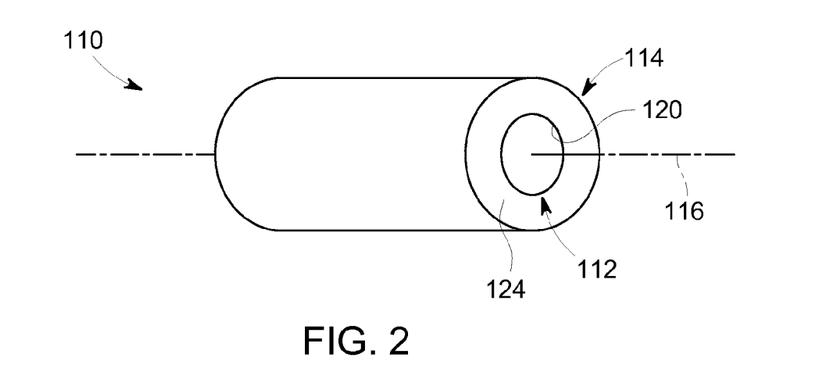
FIG. 2 is a perspective view of another embodiment of an electric machine.

For example, FIG. 2 is a perspective view of another embodiment of an electric machine 110. The electric machine 110 includes a stator 112 and a rotor assembly 114, which are concentrically aligned about a central longitudinal axis 116. The rotor assembly 114 rotates relative to the stator 112 to convert electrical energy to mechanical energy, or vice versa.

The stator 112 and rotor assembly 114 extend lengths along a central longitudinal axis 116. The rotor assembly 114 includes a rotor core 124 having a central opening 120 that extends along the central longitudinal axis 116. The stator 112 extends within the central opening 120 of the rotor core 124 such that the rotor core 124 extends around the stator 112. The rotor core 124 is configured to rotate about the central longitudinal axis 116 relative to the stator 112. In other words, the rotor core 124 is configured to rotate around the stator 112. In the illustrated embodiment of the electric machine 110, the electric machine 110 is an IPM machine. But, the electric machine 110 is not limited to being an IPM machine, as is described above with respect to the electric machine 10.

Figure 3:
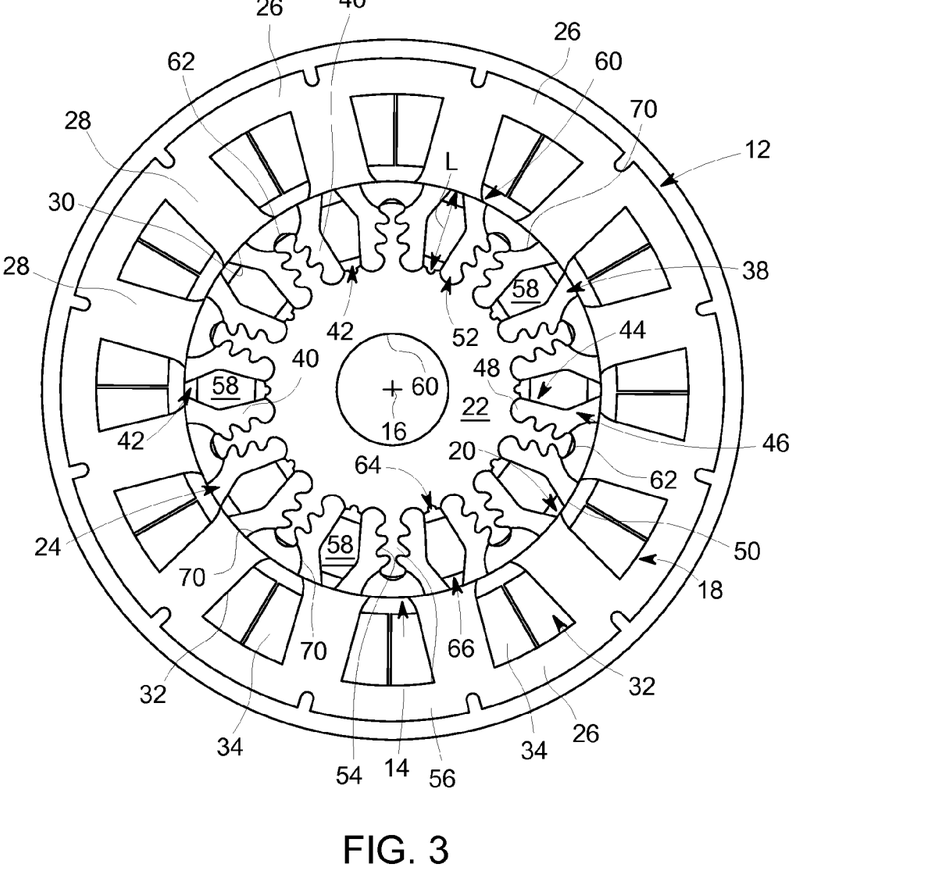
FIG. 3 is a cross-sectional view of the electric machine shown in FIG. 1.

FIG. 3 is a cross-sectional view of the electric machine 10. As described above, the electric machine 10 includes the stator 12 and the rotor assembly 14. The stator 12 includes the stator core 18, which generates a magnetic field. In the illustrated embodiment of the stator 12, the stator core 18 includes multiple segmented stator structures 26 and multiple stator teeth 28 arranged radially about the central longitudinal axis 16 in an alternating pattern. A radially spaced apart (relative to the axis 16) inner surface 30 of the stator core 18 defines the central opening 20 of the stator core 18. The stator core 18 includes multiple stator-slots 32 for concentrated windings 34 in-between multiple segmented structures 26, wherein each coil is wound around a corresponding one of the stator teeth 28. In some embodiments, the concentrated windings 34 include copper coils. In some other embodiments, the stator 12 includes fractional-slot concentrated windings (not shown). In some alternative embodiments, the structures 26 are not segmented. The stator core 18 may include any number of stator structures 26 and any number of stator teeth 28.

The rotor assembly 14 includes the shaft 22 and the rotor core 24. The rotor core 24 includes a body 38 that extends a length along the central longitudinal axis 16. The body 38 is configured to rotate about the central longitudinal axis 16 relative to the stator 12. The body 38 includes a plurality of spokes 40 arranged radially about the central longitudinal axis 16 and a plurality of conductor openings 42 arranged radially about the axis 16. The radial arrangement of the spokes 40 and the conductor openings 42 includes an alternating pattern of spokes 40 and conductor openings 42. The rotor core 24 may include any number of spokes 40 and any number of conductor openings 42.

Each spoke 40 of the body 38 of the rotor core 24 extends a length radially (relative to the axis 16) outward from a radially inner segment 44 to a radially outer segment 46. The radially inner segments 44 include radially inner surfaces 48, while the radially outer segments 46 include radially outer surfaces 50. Each radially inner surface 48 of the spokes 40 defines a portion of a central opening 52 of the body 38 of the rotor core 24. Each radially outer surface 50 of the spokes 40 defines a portion of a circumference of the rotor core body 38. In the illustrated embodiment of the spokes 40, the spokes 40 include mortices 54 that are configured to receive corresponding tenons 56 of the shaft 22 therein for mounting the rotor core body 38 to the shaft 22, as will be described below.

In the illustrated embodiment of the rotor core 24, the spokes 40 of the body 38 of the rotor core 24 are separate and distinct from each other. In other words, adjacent spokes 40 are not directly mechanically connected together. Alternatively, adjacent spokes 40 are directly mechanically connected together (e.g., engaged, being integrally formed with each other, and/or the like). The body 38 of the rotor core 24 may be formed from one or more stacks of a plurality of laminations. For example, each spoke 40 may be formed from a stack of laminations that is separate and distinct from the stacks of laminations of spokes 40 that are adjacent thereto, whether or not any adjacent separate and distinct stacks of laminations are engaged with each other. In other embodiments, two or more (e.g., all) of the spokes 40 are formed from a single stack of a plurality of laminations. For example, each lamination within the single stack may define a layer of each of the spokes 40 of the rotor core body 38. As an alternative to using one or more stacks of laminations to form the body 38 of the rotor core 24, the rotor core body 38 body may be formed as a single piece of material.

The spokes 40 and the conductor openings 42 are arranged alternatingly in the radial pattern about the central longitudinal 16 such that each conductor opening 42 extends between an adjacent pair of spokes 40. Each conductor opening 42 extends a radial length L between the adjacent pair of spokes 40, as can be seen in FIG. 3.

The rotor core 24 includes conductors 58 that extend within the conductor openings 42 of the rotor core body 38. The conductors 58 are thus held by the body 38 of the rotor core 24 between adjacent spokes 40 of the rotor core body 38. The conductors 58 generate a magnetic field to be radially directed in an air gap 60 between the rotor assembly 14 and the stator 12. The magnetic field generated by the conductors 58 further interacts with a magnetic field of the stator 12 to produce a torque. In the illustrated embodiment of the rotor core 24, the conductors 58 are permanent magnets. But, the conductors 58 are not limited to being permanent magnets, but rather may be any structure that is capable of generating and conducting a magnetic field. Other examples of the conductors 58 include, but are not limited to, a winding, a coil, a conductive bar, a conductive rod, and/or the like.

The shaft 22 extends a length along the central longitudinal axis 16. The shaft 22 is configured to rotate about the central longitudinal axis 16 relative to the stator 12. The rotor core 24 is mounted to the shaft 22 such that the rotor core 24 is configured to rotate with the shaft 22 about the central longitudinal axis 16 relative to the stator 12. In the illustrated embodiment of the rotor core 24, the rotor core 24 is mounted to the shaft 22 such that the shaft 22 is received within the central opening 52 of the rotor core body 38. Moreover, the tenons 56 of the shaft 22 are received in the mortices 54 of the spokes 40 to securely mount the rotor core 24 to the shaft 22. More specifically, the tenons 56 and mortices 54 include complementary shapes that interlock together to securely mount the rotor core 24 to the shaft 22 for rotation therewith. As shown herein, the tenons 56 and the mortices 54 interlock in a dovetail type arrangement such that the spokes 40 are dovetailed circumferentially around the shaft 22. The tenons 56 and mortices 54 may additionally or alternatively include any other shape(s) than is shown and/or described herein for interlocking together. In some alternative embodiments, only some of the spokes 40 include a mortice 54. The rotor assembly 14 may include any number of tenons 56 and any number of mortices 54. In some alternative embodiments, the shaft 22 includes one or more of the mortices 54 and the spokes 40 include one or more of the tenons 56.

The shaft 22 may include a central opening 60. In some embodiments, the central opening 60 receives the flow of a cooling fluid therein for cooling the rotor assembly 14. A conduit, or tube, may be held in the central opening 60, in a spaced apart relationship with the shaft 22, to provide both inflow and outflow of the cooling fluid.

In some embodiments, the rotor core 24 includes passages 62. The passages 62 may receive the flow of a cooling fluid therethrough for cooling the rotor assembly 14. In addition or alternatively to receiving the cooling fluid, the passages 62 may reduce mechanical stresses and/or eddy current losses of the rotor assembly 14, and/or may result in an overall mass reduction of the rotor assembly 14. In some embodiments, the rotor core 24 includes one or more bottom wedges (not shown) that extend within radailly inner segments 64 of the conductor openings 42. The bottom wedges may facilitate holding the conductors 58 in the rotor assembly 14 and/or may facilitate splaying of the conductors 58 during rotation of the rotor assembly 14. In some embodiments, the bottom wedges are non-metallic and may reduce eddy current losses in the rotor core 24. The rotor core 24 may include one or more top wedges (not shown) that extend within radially outer segments 66 of the conductor openings 42. The top wedges may facilitate holding the conductors 58 in the rotor assembly 14 and/or may facilitate splaying of the conductors 58 during rotation of the rotor assembly 14.

As can be seen in FIG. 3, the spokes 40 include slots 70 that extend through the spokes 40 along the central longitudinal axis 16. The slots 70 extend along the central longitudinal axis 16 through at least a portion of the length of the spokes 40. In the illustrated embodiment of the rotor core 24, the slots 70 extend completely through the length of the spokes 40. The slot(s) 70 of each spoke 40 are positioned within the spoke 40 radially about the central longitudinal axis 16 between the corresponding pair of adjacent conductor openings 42. As will be described below, the slots 70 facilitate reducing harmonic content in the rotor assembly 14 and/or the stator 12.

Figure 4:
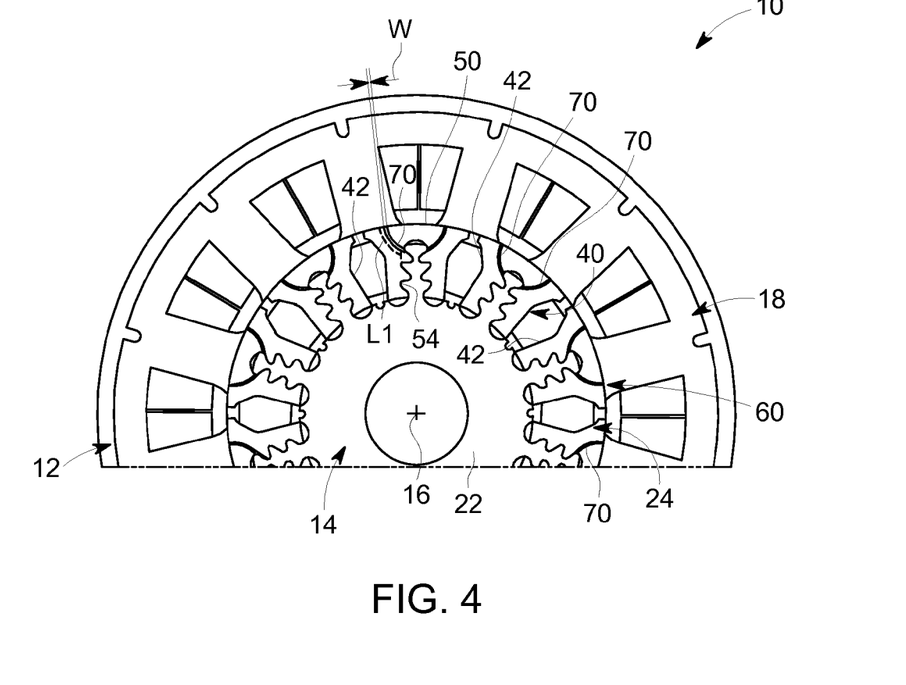
FIG. 4 is an enlarged cross-sectional view of a portion of the electric machine shown in FIGS. 1 and 3.

FIG. 4 is an enlarged cross-sectional view of a portion of the electric machine 10. In the illustrated embodiment of the slots 70, each spoke 40 includes two slots 70. But, each spoke 40 may include any number of slots 70. The slots 70 are positioned radially about the central longitudinal axis 16 such that each slot 70 extends a length $L_1$ and a width W that extend between the corresponding pair of adjacent conductor openings 42. In the illustrated embodiment of the slots 70, the length $L_1$ of each slot 70 extends along a curved path. More specifically, the length $L_1$ of each slot 70 extends between the corresponding pair of adjacent conductor openings 42 along a semi-circular path, as can be seen in FIG. 4. Within each spoke 40, the semi-circular paths of the corresponding slots 70 may be concentrically aligned. In some embodiments, the slots 70 extend through, or intersect, the radially outer surface 50 of the corresponding spoke 40. The slots 70 may extend into the mortice 54 of the corresponding spoke 40. In the illustrated embodiment of the slots 70, the semi-circular path of the length $L_1$ of each slot 70 extends from the mortice 54 of the corresponding spoke 40 to, and through, the radially outer surface 50 of the corresponding spoke 40.

The slots 70 facilitate reducing harmonic content in the rotor assembly 14 and/or the stator 12. For example, the slots 70 may facilitate reducing harmonic content in the rotor core 24, the shaft 22, and/or the stator core 18. Such harmonic content may generate asynchronous rotating fields that produce eddy currents in the rotor assembly 14 (e.g., in a surface of the rotor core 24), the stator 12, and/or in the air gap 60 between the rotor assembly 14 and the stator 12. Such eddy currents consume power and reduce the efficiency of the electric machine 10. For example, such eddy currents may generate relatively significant losses in the rotor core 24, the shaft 22, and/or the stator 12. By reducing such harmonic content, the slots 70 reduce the eddy currents and therefore reduce the losses of the rotor core 24, the shaft 22, and/or the stator 12. The slots 70 therefore facilitate improving the efficiency of the electric machine 10, which may enable a power density of the electric machine 10 to be increased. Moreover, an increase in the power density of the electric machine 10 may enable the use of less material (e.g., iron and/or magnet material) within the electric machine 10, which may reduce the cost of the electric machine 10. The features described in this paragraph may also be provided by the other slot embodiments (e.g., the slots 270, 370, 470, 570, 670, and 770) described and/or illustrated herein.

Various parameters of the slots 70 may be selected to reduce a predetermined amount of the harmonic content in the rotor assembly 14 and/or the stator 12. For example, the shape of the path of the length $L_1$ of each of the slots 70 may be selected to reduce a predetermined amount of harmonic content. In the illustrated embodiment of the slots 70, the path of the length $L_1$ of each of the slots 70 has a semi-circular shape. Other examples of the shape of the path of the length $L_1$ of each of the slots 70 include, but are not limited to, an approximately straight path, a curved path that is not semi-circular, an elliptical path, a circular path, an angled (or bent) path, and/or the like. Other examples of parameters of the slots 70 that may be selected include, but are not limited to, the dimension of the width W of the slots 70, the dimension of the length $L_1$ of the slots 70, and/or the radius of the semi-circular path of the slots 70. Each slot 70 may have any length $L_1$ and may have any width W. Further examples of the parameters of the slots 70 that may be selected include, but are not limited to, the location of each slot 70 along the corresponding spoke 40, the orientation of each slot 70 relative to the corresponding spoke 40 and/or relative to the central longitudinal axis 16, and/or the like. The selection of the parameters of the slots 70 may depend on the particular design, structure, configuration, arrangement, and/or the like of the electric machine.

In addition or alternative to reducing harmonic content within the rotor assembly 14 and/or the stator 12, the slots 70 may provide one or more other features. For example, the reduction of the eddy currents in the rotor assembly 14, the stator 12, and/or in the air gap 60 reduces the amount of heat generated within the electric machine 10 by the eddy currents. Accordingly, the electrical machine 10 may be operated at a reduced temperature, which may improve the reliability and/or robustness of the electric machine 10 and/or may improve the lifetime of the electric machine 10. In addition or alternatively to reducing the operating temperature of the electric machine 10, the reduction of the amount of heat generated within the electric machine 10 by the eddy currents may enable relaxation of the constraints on the cooling mechanisms of the electric machine 10. Relaxing of the cooling constraints may reduce the operating costs of the electric machine 10, may improve the reliability and/or robustness of the electric machine 10, may reduce the cost of the cooling mechanisms of the electric machine 10, and/or may improve the lifetime of the electric machine 10. Moreover, and for example, the slots 70 may be located along the spokes 40 in locations that reduce a torque ripple (e.g., noise, vibration, and/or the like) of the electric machine 10, which may improve the lifetime of the electric machine 10, for example by reducing high-cycle fatigue. Additionally, the slots 70 may provide sensor-less control of the electric machine 10. More specifically, the slots 70 can be used to provide information regarding the position of the rotor core 24, which may enable the elimination of a position sensor (e.g., an encoder, resolver, and/or the like) of the electric machine 10. The elimination of such a position sensor may reduce the cost of the electric machine 10 and/or may improve a reliability of the electric machine 10. The features described in this paragraph may also be provided by the other slot embodiments (e.g., the slots 270, 370, 470, 570, 670, and 770) described and/or illustrated herein.

Figure 5:
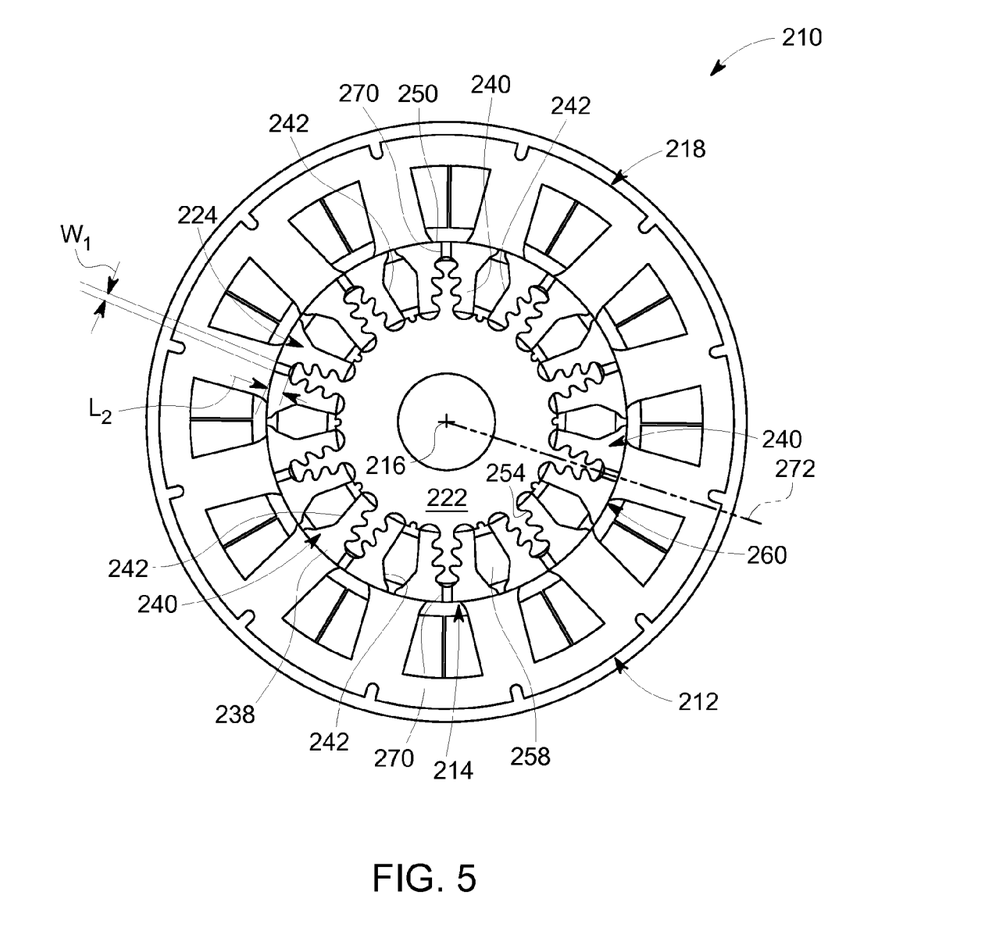
FIG. 5 is a cross-sectional view of another embodiment of an electric machine.

FIG. 5 is a cross-sectional view of another embodiment of an electric machine 210. The electric machine 210 includes a stator 212 and a rotor assembly 214. The stator 212 includes a stator core 218, which generates a magnetic field. The rotor assembly 214 includes a shaft 222 and a rotor core 224. The rotor core 224 includes a body 238 that extends a length along a central longitudinal axis 216. The body 238 is configured to rotate about the central longitudinal axis 216 relative to the stator 212. The body 238 includes a plurality of spokes 240 arranged radially about the central longitudinal axis 216 and a plurality of conductor openings 242 arranged radially about the axis 216. The radial arrangement of the spokes 240 and the conductor openings 242 includes an alternating pattern of spokes 240 and conductor openings 242.

The rotor core 224 includes conductors 258 that extend within the conductor openings 242 of the rotor core body 238. The conductors 258 generate a magnetic field to be radially directed in an air gap 260 between the rotor assembly 214 and the stator 212. The magnetic field generated by the conductors 258 further interacts with a magnetic field of the stator 212 to produce a torque. The shaft 222 extends a length along the central longitudinal axis 216 and is configured to rotate about the central longitudinal axis 216 relative to the stator 212. The rotor core 224 is mounted to the shaft 222 such that the rotor core 224 is configured to rotate with the shaft 222 about the central longitudinal axis 216 relative to the stator 212.

The spokes 240 include slots 270 that extend through the spokes 240 along the central longitudinal axis 216. The slots 270 extend along the central longitudinal axis 216 through at least a portion of the length of the spokes 240. In the illustrated embodiment of the slots 270, the slots 270 extend completely through the length of the spokes 240. Moreover, in the illustrated embodiment of the slots 270, each spoke 240 includes a single slot 270. But, each spoke 240 may include any number of slots 270.

The slot(s) 270 of each spoke 240 are positioned within the spoke 240 radially about the central longitudinal axis 216 between the corresponding pair of adjacent conductor openings 242. More specifically, the slots 270 are positioned radially about the central longitudinal axis 216 such that each slot 270 extends a length $L_2$ and a width $W_1$ that extend between the corresponding pair of adjacent conductor openings 242. In the illustrated embodiment of the slots 270, each slot 270 is elongate, wherein the length $L_2$ of each slot 270 extends along an approximately straight path. In some embodiments, the length $L_2$ of each slot 270 extends between the corresponding pair of adjacent conductor openings 242 along an approximately straight radial path relative to the central longitudinal axis 216, as can be seen in FIG. 5. By "an approximately straight radial path relative to the central longitudinal axis 216", it is meant that the approximately straight length $L_2$ of the slot 270 is approximately parallel to a radial axis 272 that extends from the central longitudinal axis 16 and intersects the slot 270. The slots 270 may extend through, or intersect, a radially outer surface 250 of the corresponding spoke 240. In some embodiments, the slots 270 extend into a mortice 254 of the corresponding spoke 240. In the illustrated embodiment of the slots 270, the approximately straight path of the length $L_2$ of each slot 270 extends from the mortice 254 of the corresponding spoke 240 to, and through, the radially outer surface 250 of the corresponding spoke 240.

Various parameters of the slots 270 may be selected to reduce a predetermined amount of the harmonic content in the rotor assembly 214 and/or the stator 212, for example as is described above with respect to the slots 70 (FIGS. 3 and 4). Each slot 270 may have any length $L_2$ and may have any width $W_1$.

Figure 6:
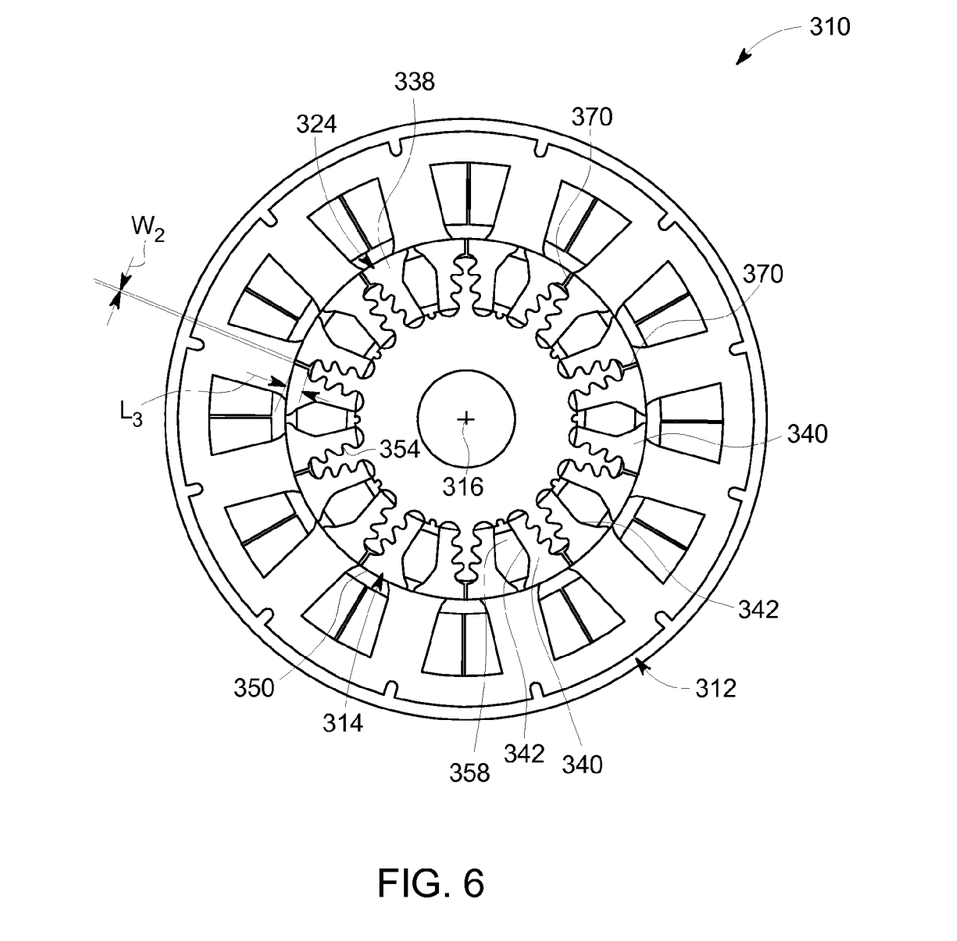
FIG. 6 is a cross-sectional view of another embodiment of an electric machine.

FIG. 6 is a cross-sectional view of another embodiment of an electric machine 310. The electric machine 310 includes a stator 312 and a rotor assembly 314 that is configured to rotate relative to the stator 312. The rotor assembly 314 includes a rotor core 324 having a body 338 that extends a length along a central longitudinal axis 316. The body 338 includes a plurality of spokes 340 arranged radially about the central longitudinal axis 316 and a plurality of conductor openings 342 arranged radially about the axis 316 in an alternating pattern with the spokes 340. The rotor core 324 includes conductors 358 that extend within the conductor openings 342 of the rotor core body 338.

The spokes 340 include slots 370 that extend along the central longitudinal axis 316 through at least a portion of the length of the spokes 340. Each spoke 340 may include any number of the slots 370. The slot(s) 370 of each spoke 340 are positioned within the spoke 340 radially about the central longitudinal axis 316 between the corresponding pair of adjacent conductor openings 342. More specifically, the slots 370 are positioned radially about the central longitudinal axis 316 such that each slot 370 extends a length $L_3$ and a width $W_2$ that extend between the corresponding pair of adjacent conductor openings 342. In the illustrated embodiment of the slots 370, each slot 370 is elongate, wherein the length $L_3$ of each slot 370 extends along an approximately straight path. The length $L_3$ of each slot 370 may extend between the corresponding pair of adjacent conductor openings 342 along an approximately straight radial path relative to the central longitudinal axis 316, as can be seen in FIG. 6. In the illustrated embodiment of the slots 370, the approximately straight path of the length $L_3$ of each slot 370 extends from a mortice 354 of the corresponding spoke 340 to, and through, a radially outer surface 350 of the corresponding spoke 340.

Various parameters of the slots 370 may be selected to reduce a predetermined amount of the harmonic content in the rotor assembly 314 and/or the stator 312, for example as is described above with respect to the slots 70 (FIGS. 3 and 4). Each slot 370 may have any length $L_3$ and may have any width $W_2$.

Figure 7:
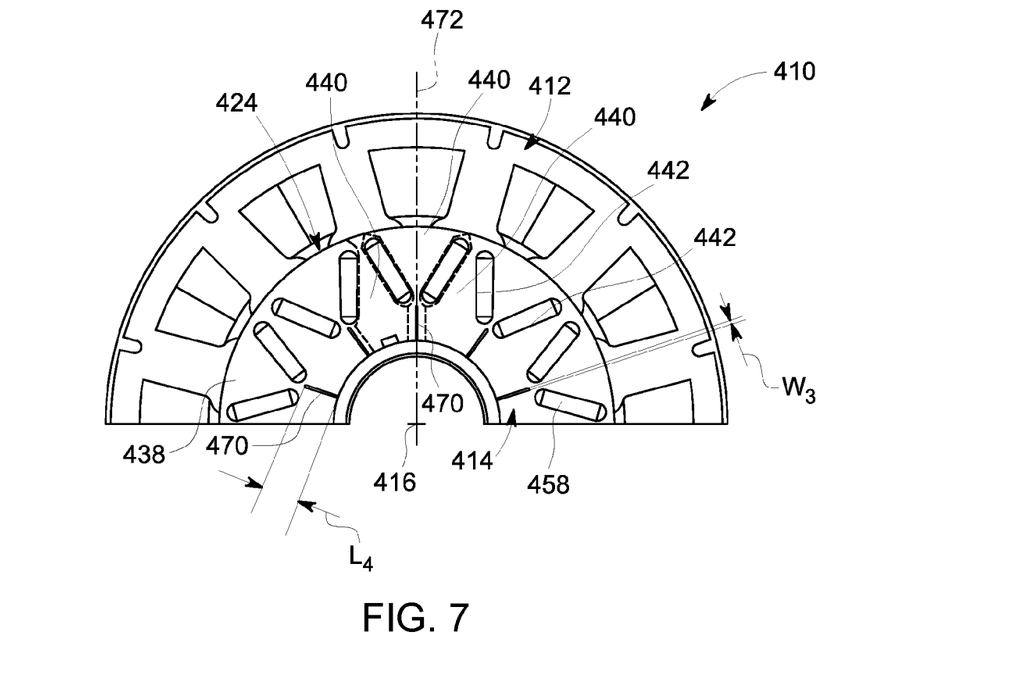
FIG. 7 is a cross-sectional view of a portion of another embodiment of an electric machine.

FIG. 7 is a cross-sectional view of a portion of another embodiment of an electric machine 410. The electric machine 410 includes a stator 412 and a rotor assembly 414 that is configured to rotate relative to the stator 412. The rotor assembly 414 includes a rotor core 424. The rotor core 424 includes a body 438 that extends a length along a central longitudinal axis 416. The body 438 includes a plurality of spokes 440 arranged radially about the central longitudinal axis 416 and a plurality of conductor openings 442 arranged radially about the axis 416. The radial arrangement of the spokes 440 and the conductor openings 442 includes an alternating pattern of spokes 440 and conductor openings 442. In the illustrated embodiment of the rotor core 424, adjacent spokes 440 of the body 438 of the rotor core 424 are directly mechanically connected together. For example, the body 438 of the rotor core 424 may be formed as a single piece of material. Two adjacent spokes 440 are delineated by phantom lines in FIG. 7 for clarity.

The rotor core 424 includes conductors 458 that extend within the conductor openings 442 of the rotor core body 438. In the illustrated embodiment of the rotor core 424, adjacent conductor openings 442 are angled relative to each other such that adjacent conductor openings 442 define an approximate V-shape. Within a pair of adjacent conductor openings 442 that define the approximate V-shape, the adjacent conductor openings 442 are spaced apart from each other along a center axis 472 that extends radially outward from the central longitudinal axis 416.

The spokes 440 include slots 470 that extend through the spokes 440 along the central longitudinal axis 416. The slots 470 extend along the central longitudinal axis 416 through at least a portion of the length of the spokes 440. In the illustrated embodiment of the slots 470, the slots 470 extend completely through the length of the spokes 440. Moreover, in the illustrated embodiment of the slots 470, each spoke 440 includes a single slot 470. But, each spoke 440 may include any number of slots 470.

The slot(s) 470 of each spoke 440 are positioned within the spoke 440 radially about the central longitudinal axis 416 between the corresponding pair of adjacent conductor openings 442. More specifically, the slots 470 are positioned radially about the central longitudinal axis 416 such that each slot 470 extends a length $L_4$ and a width $W_3$ that extend between the corresponding pair of adjacent conductor openings 442. Each slot 470 is considered to be between the corresponding pair of adjacent conductor openings 442 because each slot 470 intersects the corresponding center axis 472.

Figure 8:
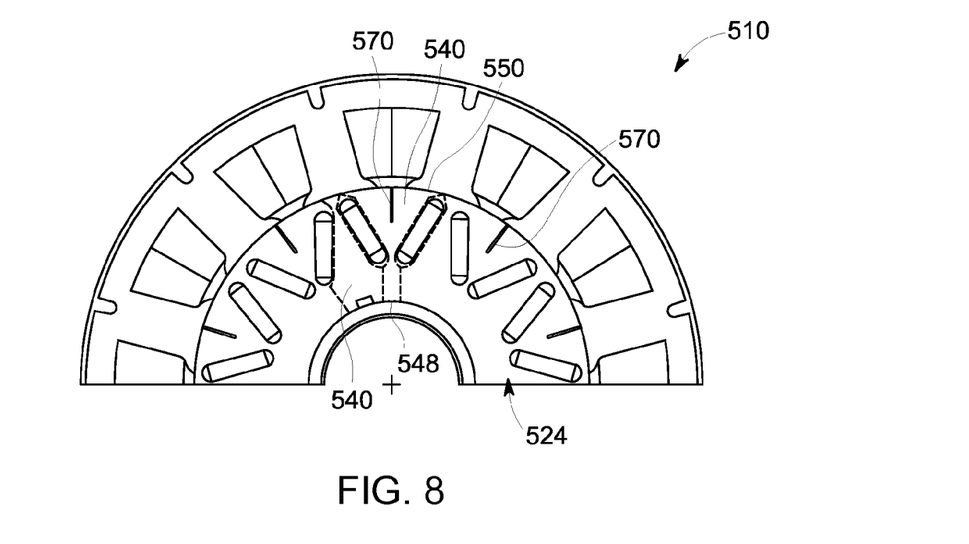
FIG. 8 is a cross-sectional view of a portion of another embodiment of an electric machine.

In the illustrated embodiment of the slots 470, each slot 470 is elongate, wherein the length $L_4$ of each slot 470 extends along an approximately straight path. In some embodiments, the length $L_4$ of each slot 470 extends between the corresponding pair of adjacent conductor openings 442 along an approximately straight radial path relative to the central longitudinal axis 416, as can be seen in FIG. 7. In some embodiments, the slots 470 extend through, or intersect, a radially inner surface 448 of the corresponding spoke 440. Alternatively, the slots 470 extend through a radially outer surface 450 of the corresponding spoke 440. For example, FIG. 8 is a cross-sectional view of a portion of another embodiment of an electric machine 510. The electrical machine 510 includes a rotor core 524 having spokes 540 that include slots 570. The slots 570 are substantially similar to the slots 470 (FIG. 7) except the slots 570 extend through a radially outer surface 550 of the corresponding spoke 540 instead of through a radially inner surface 548 of the corresponding spoke 540.

Referring again to FIG. 7, various parameters of the slots 470 may be selected to reduce a predetermined amount of the harmonic content in the rotor assembly 414 and/or the stator 412, for example as is described above with respect to the slots 70 (FIGS. 3 and 4). Each slot 470 may have any length $L_4$ and may have any width $W_3$.

Figure 9:
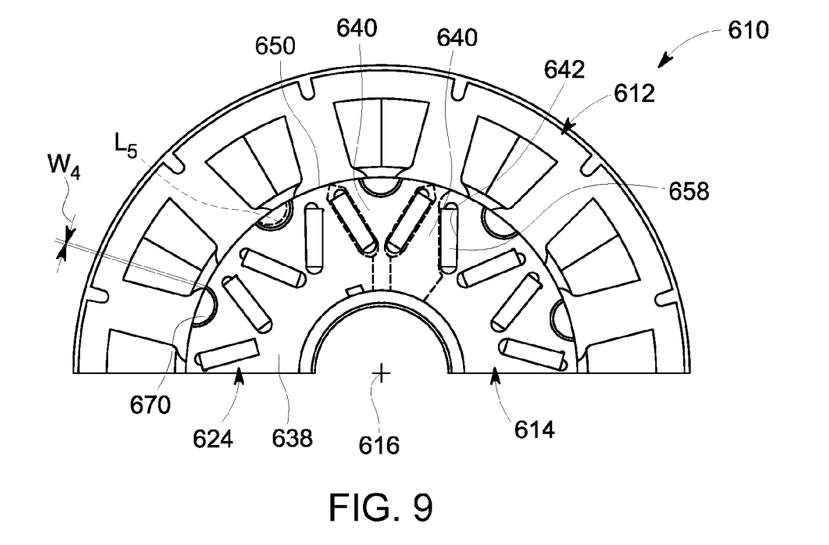
FIG. 9 is a cross-sectional view of a portion of another embodiment of an electric machine.

FIG. 9 is a cross-sectional view of a portion of another embodiment of an electric machine 610. The electric machine 610 includes a stator 612 and a rotor assembly 614 that is configured to rotate relative to the stator 612. The rotor assembly 614 includes a rotor core 624. The rotor core 624 includes a body 638 that extends a length along a central longitudinal axis 616. The body 638 includes a plurality of spokes 640 arranged radially about the central longitudinal axis 616 and a plurality of conductor openings 642 arranged radially about the axis 616 in an alternating pattern with the spokes 640. In the illustrated embodiment of the rotor core 624, adjacent spokes 640 of the body 638 of the rotor core 624 are directly mechanically connected together. For example, the body 638 of the rotor core 624 may be formed as a single piece of material.

The rotor core 624 includes conductors 658 that extend within the conductor openings 642 of the rotor core body 638. In the illustrated embodiment of the rotor core 624, adjacent conductor openings 642 are angled relative to each other such that adjacent conductor openings 642 define an approximate V-shape.

The rotor core 624 includes slots 670 that are positioned radially about the central longitudinal axis 616 such that each slot 670 extends a length $L_5$ and a width $W_4$ that extend between the corresponding pair of adjacent conductor openings 642. Each spoke 640 may include any number of slots 670. In the illustrated embodiment of the slots 670, the length $L_5$ of each slot 670 extends between the corresponding pair of adjacent conductor openings 642 along a semi-circular path, as can be seen in FIG. 9. The slots 670 may extend through, or intersect, a radially outer surface 650 of the corresponding spoke 640. In the illustrated embodiment of the slots 670, the semi-circular path of the length $L_5$ of each slot 670 extends through the radially outer surface 650 of the corresponding spoke 640 at two opposite ends of the length $L_5$ of the slot 670.

Various parameters of the slots 670 may be selected to reduce a predetermined amount of the harmonic content in the rotor assembly 614 and/or the stator 612, for example as is described above with respect to the slots 70 (FIGS. 3 and 4). Each slot 670 may have any length $L_5$ and may have any width $W_4$.

Figure 10:
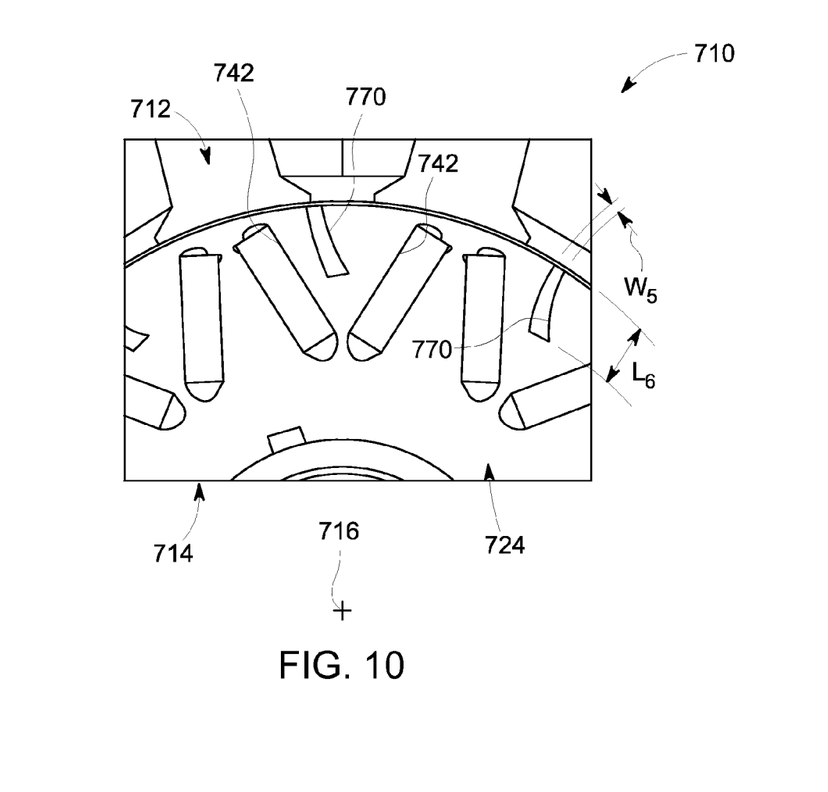
FIG. 10 is a cross-sectional view of a portion of another embodiment of an electric machine.

FIG. 10 is a cross-sectional view of another embodiment of an electric machine 710 illustrating another embodiment of a slot 770. The electric machine 710 includes a stator 712 and a rotor assembly 714 that rotates relative to the stator 712. The rotor assembly 714 includes a rotor core 724 having slots 770 that are positioned radially about a central longitudinal axis 716 such that each slot 770 extends a length $L_6$ and a width $W_5$ that extend between a corresponding pair of adjacent conductor openings 742 of the rotor core 724. The length $L_6$ of each slot 770 extends along a curved path. Moreover, and as can be seen in FIG. 10, the width $W_5$ of the slot 770 is non-uniform along the length $L_6$ of the slot 770. In other words, the width $W_5$ is variable along the length $L_6$ of the slot 770. In some embodiments, the shape of the slot 770 is parallel to a flux path produced by the stator 712. Various parameters of the slots 770 may be selected to reduce a predetermined amount of the harmonic content in the rotor assembly 714 and/or the stator 712, for example as is described above with respect to the slots 70 (FIGS. 3 and 4).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A rotor core for an electric machine, the rotor core comprising:

a body extending a length along, and being configured to rotate about, a central longitudinal axis, the body comprising spokes arranged radially about the central longitudinal axis and conductor openings arranged radially about the central longitudinal axis, the radial arrangement of the spokes and conductor openings about the central longitudinal axis comprising an alternating pattern of spokes and conductor openings, wherein the spokes radially extend from a first interface between the spokes and a stator core of the electric machine, wherein the spokes comprise slots extending therethrough along the central longitudinal axis from the first interface between the spokes and the stator core, through the spokes, and to a second interface between the spokes and a shaft of the electric machine, the slots being positioned radially about the central longitudinal axis between adjacent conductor openings, wherein the spokes extend radially outward from radially inner segments of the spokes to radially outer segments of the spokes, the radially outer segments of the spokes comprising radially outer surfaces that each defines a portion of a circumference of the body, wherein the slots extend between adjacent conductor openings along semi-circular paths, the semi-circular paths of the slots intersecting the radially outer surfaces of the corresponding spokes; and conductors for conducting magnetic fields extending within the conductor openings of the body.

2. The rotor core of claim 1, wherein the radially inner segments of the spokes comprising radially inner surfaces that each defines a portion of a central opening of the body, wherein the slots extend through the radially inner surface of the corresponding spoke.

3. The rotor core of claim 1, wherein the slots extend through the radially outer surface of the corresponding spoke.

4. The rotor core of claim 1, wherein the spokes of the body comprise mortices that are configured to receive tenons of the shaft therein for mounting the body on the shaft, the slots of the spokes extending into the mortice of the corresponding spoke.

5. The rotor core of claim 1, wherein the conductors comprise one or more of a winding, a coil, or conductive bars.

6. The rotor core of claim 1, wherein the body of the rotor core comprises at least one stack of a plurality of laminations.

7. A rotor assembly for an electric machine, the rotor assembly comprising:

a shaft extending a length along, and being configured to rotate about, a central longitudinal axis; and a rotor core mounted to the shaft such that the rotor core is configured to rotate with the shaft about the central longitudinal axis, the rotor core comprising:

conductor openings arranged radially about the central longitudinal axis;

spokes arranged radially about the central longitudinal axis, wherein the radial arrangement of the spokes and conductor openings about the central longitudinal axis comprises an alternating pattern of spokes and conductor openings, wherein the spokes radially extend from a first interface between the spokes and a stator core of the electric machine, the spokes comprising slots extending therethrough along the central longitudinal axis from the first interface between the spokes and the stator core, through the spokes, and to a second interface between the spokes and the shaft, the slots being positioned radially about the central longitudinal axis between adjacent conductor openings, wherein the spokes extend radially outward from radially inner segments of the spokes to radially outer segments of the spokes, the radially outer segments of the spokes comprising radially outer surfaces that each defines a portion of a circumference of the body, wherein the slots extend between adjacent conductor openings along semi-circular paths, the semi-circular paths of the slots intersecting the radially outer surfaces of the corresponding spokes; and conductors for conducting magnetic fields extending within the conductor openings.

8. The rotor assembly of claim 7, wherein the spokes of the rotor core comprise mortices, the shaft comprising tenons that are interlocked with the mortices such that the rotor core is mounted on the shaft for rotation therewith.

9. The rotor assembly of claim 7, wherein the radially inner segments of the spokes comprising radially inner surfaces that each defines a portion of a central opening of the rotor core, wherein the slots extend through the radially inner surface of the corresponding spoke.

10. An electric machine comprising:

a stator extending a length along a central longitudinal axis, the stator comprising a stator core having a central opening that extends along the central longitudinal axis; and a rotor assembly extending within the central opening of the stator core, the rotor assembly comprising a rotor core configured to rotate about central longitudinal axis within the central opening, the rotor core comprising:

conductor openings arranged radially about the central longitudinal axis;

spokes arranged radially about the central longitudinal axis, wherein the radial arrangement of the spokes and conductor openings about the central longitudinal axis comprises an alternating pattern of spokes and conductor openings, wherein the spokes radially extend from a first interface between the spokes and the stator core, the spokes comprising slots extending therethrough along the central longitudinal axis from the first interface between the spokes and the stator core, through the spokes, and to a second interface between the spokes and a shaft to which the rotor assembly is configured to couple, the slots being positioned radially about the central longitudinal axis between adjacent conductor openings, wherein the spokes extend radially outward from radially inner segments of the spokes to radially outer segments of the spokes, the radially outer segments of the spokes comprising radially outer surfaces that each defines a portion of a circumference of the body, wherein the slots extend between adjacent conductor openings along semi-circular paths, the semi-circular paths of the slots intersecting the radially outer surfaces of the corresponding spokes; and conductors for conducting magnetic fields extending within the conductor openings.

* * * * *